July 6, 1965
L. JOSEPHSON
3,192,956
PREFABRICATED CONDUITS
Filed April 3, 1962
5 Sheets-Sheet 1
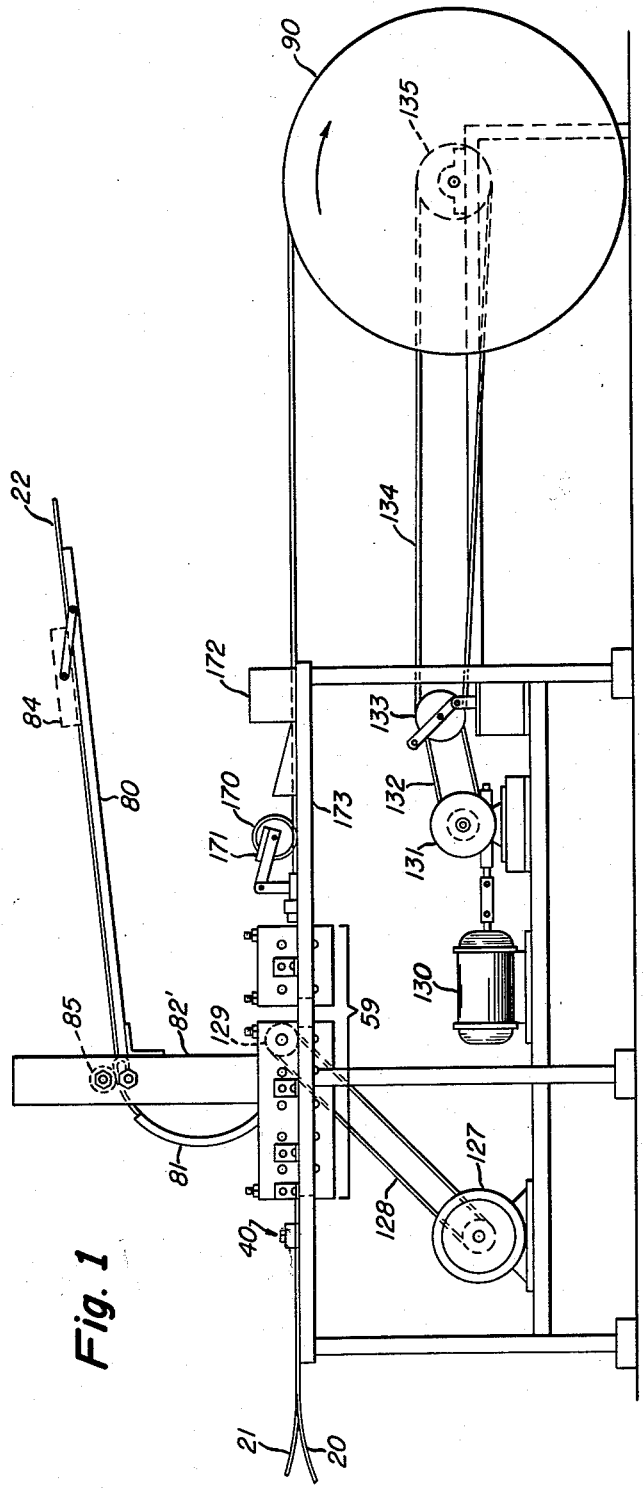
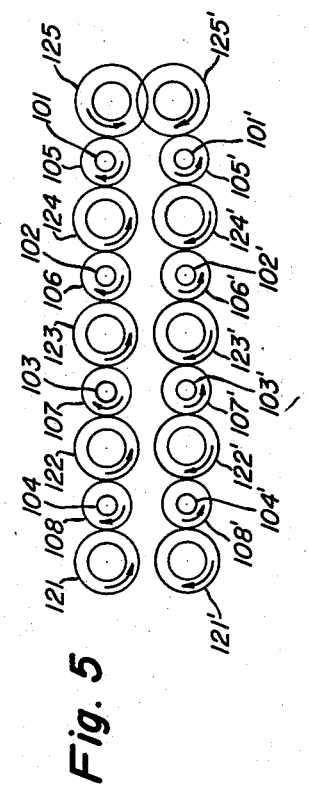
INVENTOR.
Louis Josephson
BY
Merriam, Smith & Marshall
ATTORNEYS

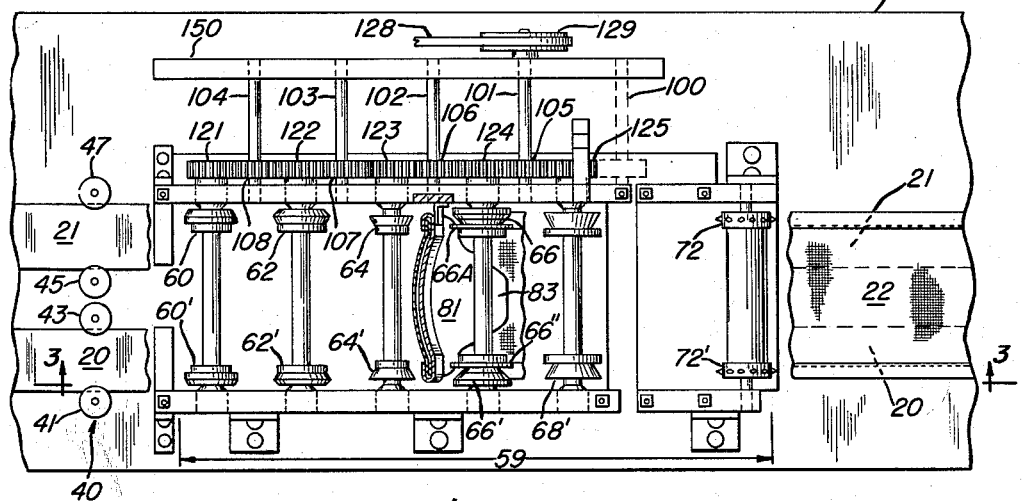
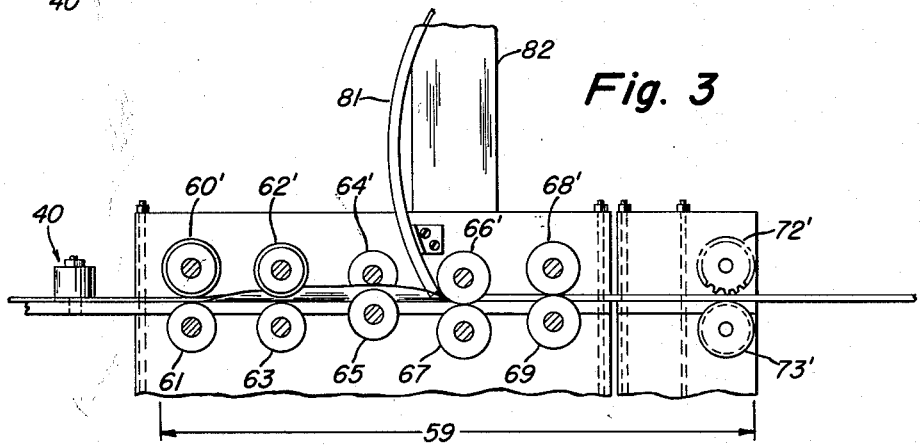
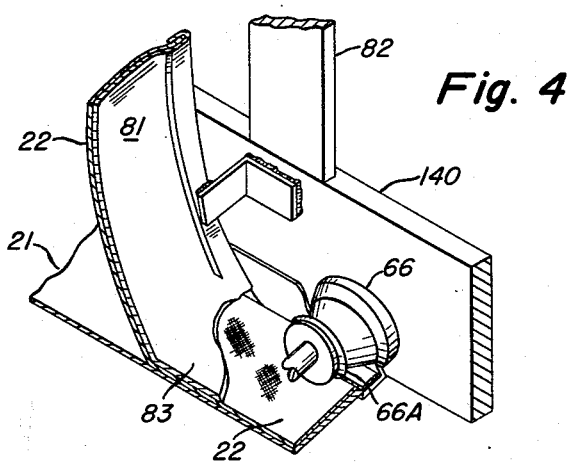

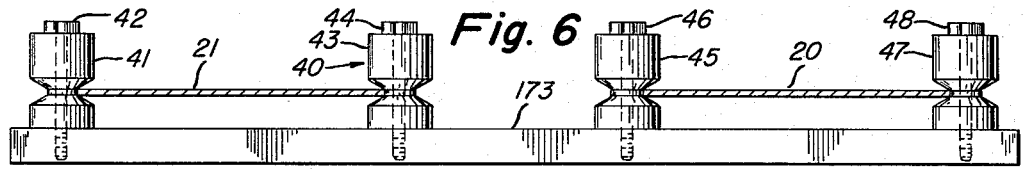
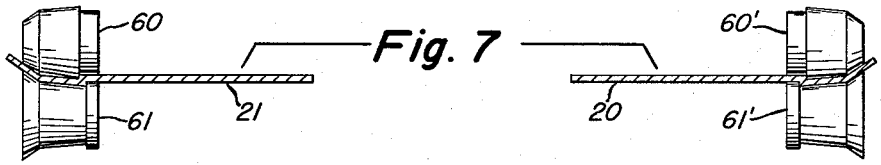

July 6, 1965
L. JOSEPHSON
3,192,956
PREFABRICATED CONDUITS
Filed April 3, 1962
5 Sheets-Sheet 4
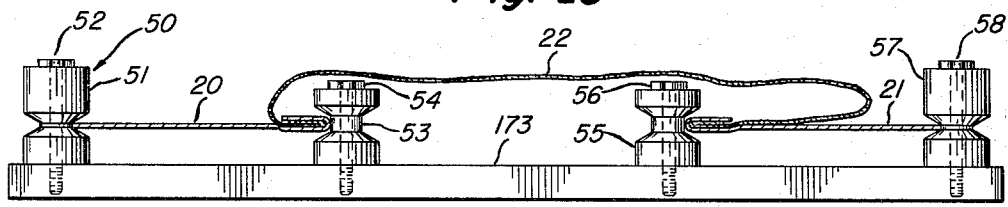
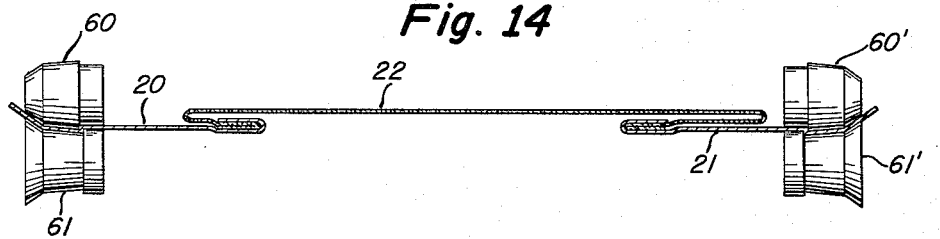
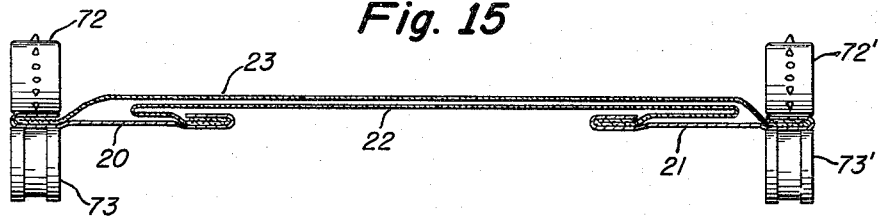
INVENTOR.
Louis Josephson
BY
Merriam, Smith & Marshall
ATTORNEYS July 6, 1965 L. JOSEPHSON 3,192,956
PREFABRICATED CONDUITS
Filed April 3, 1962 5 Sheets-Sheet 5

INVENTOR.
Louis Josephson
BY
Merriam, Smith & Marshall
ATTORNEYS

United States Patent Office

3,192,956
Patented July 6, 1965

3,192,956
PREFABRICATED CONDUITS
Louis Josephson, New York, N.Y., assignor to Elgen Manufacturing Corp., Long Island City, N.Y., a corporation of New York
Filed Apr. 3, 1962, Ser. No. 184,837
5 Claims. (Cl. 138—163)

The present invention relates generally to prefabricated conduits and to methods for producing same.

More specifically, this invention relates to secured-together conduit assemblies of desired lengths that may be continuously made in a substantially flat or folded condition and, if desired, continuously coiled, as it is being assembled in advance of the coiler, for ease of handling or shipment. The folded conduit may be readily expanded and maintained in an open position to provide a conduit for distributing conditioned (e.g., heated or cooled) or exhausted air to desired remote locations. If desired, the expanded conduit may be readily collapsed in a flat condition and coiled for later use.

Although air distribution systems of portable or fixed type useful for remote application of conditioned air have heretofore been proposed, these systems have been of a fixed conduit type that is not readily detached for storing, cannot be selectively or easily expanded and collapsed, have been too costly to fabricate or too time-consuming to erect, or have been unsuitable for other reasons.

In recognition of this situation, this invention provides a readily constructed, substantially air-impervious distribution system composed of suitable lengths of prefabricated, light-weight, flexible, expandable-collapsible conduit that may be readily and conveniently stored and used. A continuous length of my folded conduit may be pulled from a coil when needed and quickly expanded and maintained in that condition to direct and discharge conditioned air from a permanent or portable or mobile air-conditioning unit to remote areas; the conduit may also be readily collapsed and coiled for further use.

My conduit may be used, for example, to economically distribute hot air from a mobile heating unit to selected points throughout buildings that are under construction and thus obviate the need for the multitude of costly and dangerous gas (e.g., butane) stoves that are now used. My conduit may also be used to discharge exhausted air from confined areas such as a mine.

My prefabricated collapsed conduit may be made by a method comprising: longitudinally advancing two elongated metal strips along substantially parallel and straight paths in predetermined widthwise relationship; placing an elongated strip of flexible, substantially air-impervious fabric upon the advancing metal strips; progressively bending the outer marginal side edge portion of each metal strip over upon the marginal side edge portions of the fabric to secure the metal strips to the fabric; positioning the secured-together product so that the metal strips extend outwardly of the fabric with the free edge portion of each metal strip being outermost; placing a second elongated strip of flexible, substantially air-impervious fabric upon the advancing secured-together metal to fabric strips; progressively bending the free edge portion of each metal strip over upon the marginal side edge portions of the second fabric to secure the outermost edge portions of the metal strips to said second fabric to form a collapsed, substantially flat secured-together conduit; and coiling the resulting secured-together collapsed conduit.

When a desired length of the collapsed conduit is removed from the coiler, expanded and maintained in that position, it defines a four-sided conduit having a pair of opposed metal sides and opposed fabric sides, all of which sides are marginally connected to adjacent sides.

In making my collapsed conduit, one may use the roll-forming machine shown in U.S. Patent 2,825,384 by running the metal strips through the machine twice to secure in each run a different length of fabric to different side edge portions of the metal strips.

The metal strips may be progressively bent while they are advanced either in overlapped or non-overlapped position with respect to each other.

As indicated above, after the outer marginal edge portions of the metal strips are bent over upon the side marginal edge portions of the first fabric, the unsecured portion of the metal strips is unfolded from beneath the fabric by being pivoted along its bent edge to a position wherein the former inner free edge portion becomes the outermost edge of the secured-together product. Unless the secured-together product is also turned over, the outermost unsecured edge portions of the metal strips will be bent and secured to the second fabric on a different side of the metal strips to which the first fabric was secured. In the herein described drawings, this inversion step is shown; however, if desired, it may be omitted.

The reel for coiling the completed collapsed conduit assembly serves to produce the conduit in compact form and applies directional tension to the advancing strips so as to assure that the strips are advanced at the proper rate and thereby avoid tearing the fabric or buckling the metal.

The metal strips may consist of, for example, 24 or 26 gauge galvanized steel and flexible, woven or unwoven or coated fabric may be used, such as neoprene, canvas, asbestos, canvas coated with rubber or synthetic resinous materials, or the like.

In the accompanying diagrammatic drawings:

FIGURE 1 is a side elevational view of the roll-forming machine and coiling reel, and shows two metal strips and a strip of fabric being continuously secured together and coiled;

FIGURE 2 is a fragmentary plan view of the roll-forming machine showing successive forming rolls, flexible fabric and a fabric guide (in section);

FIGURE 3 is a sectional view taken along the line 3—3 of FIGURE 2;

FIGURE 4 is a fragmentary perspective sectional view showing the fabric guide placing the fabric upon a partly formed strip of metal;

FIGURE 5 shows the gear train employed to drive the metal forming rolls;

FIGURE 6 is a fragmentary view showing a metal guide at the entrance of the roll-forming machine for guiding two strips of metal in side-by-side, spaced-apart parallel relationship:

FIGURE 7 is a fragmentary view showing the first set of forming rolls and the two guided metal strips (shown in section) with outer marginal side edge portions being progressively bent by these rolls;

FIGURES 8 and 9 are similar to FIGURE 7 and show the forming rolls at the second and third roll-forming stations progressively bending the outer marginal side edge portion of each of the metal strips;

FIGURE 10 is similar to FIGURE 9 and shows the strip of fabric (in section) positioned on the metal strips at the fourth set of forming rolls and the rolls progressively bending the outer edge portion of each metal strip toward the fabric;

FIGURE 11 is similar to FIGURE 10 and shows the fifth roll-forming station;

FIGURE 12 is similar to FIGURES 10 and 11 and shows staking or crimping rolls at the sixth roll-forming station progressively bending the metal strips securely onto the side edges of the fabric;

FIGURE 13 is similar to FIGURE 6 and shows a metal guide at the entrance of the roll-forming machine for guiding the two strips of metal of the secured-together product formed at the roll-forming station shown in FIGURE 12 in side-by-side, spaced-apart parallel relationship, after the metal strips of the secured-together product have been unfolded and the product has been inverted;

Figure 16:
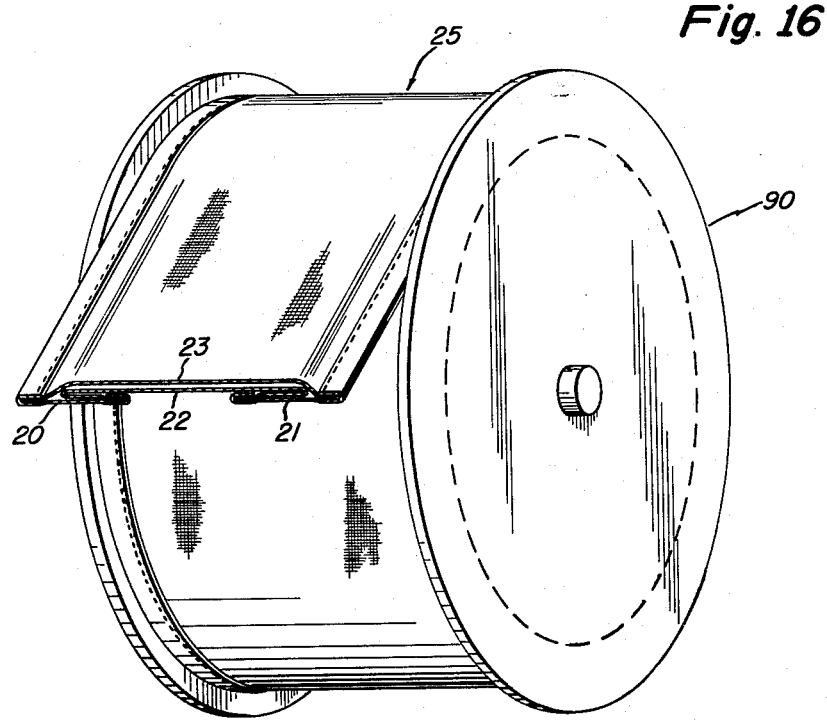
Figure 17:
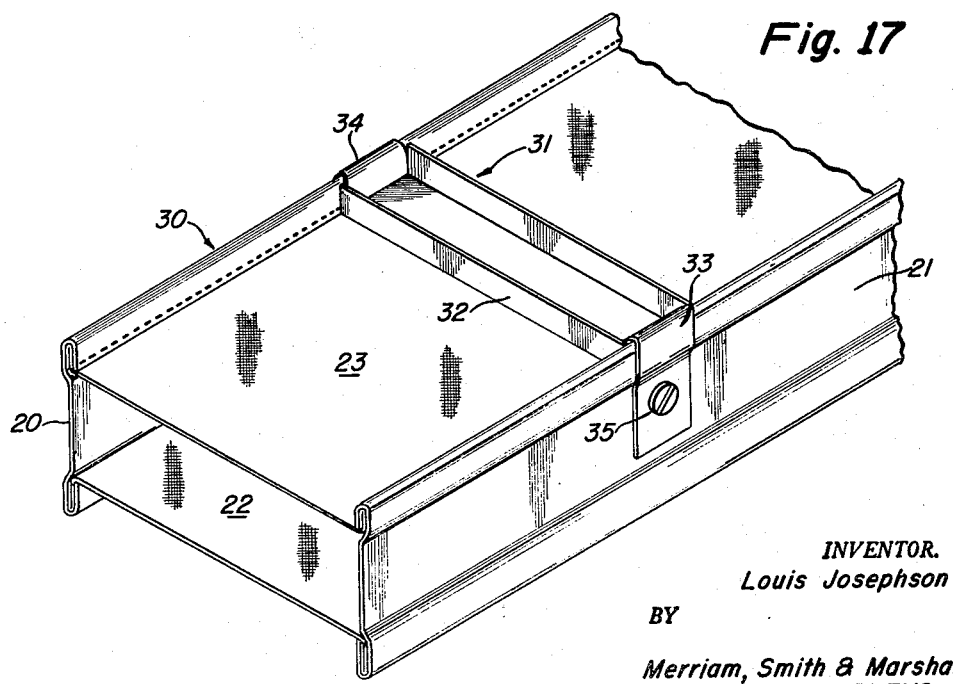

FIGURE 14 corresponds to FIGURE 7 and shows the free or outermost edge portion of each of the metal strips being progressively bent at the first roll-forming station of the second pass through the roll-forming machine;

FIGURE 15 is similar to FIGURE 12 and shows staking or crimping rolls progressively bending the metal strips securely onto the side edges of the second strip of fabric to form a secured-together prefabricated collapsed conduit;

FIGURE 16 is a perspective view showing the construction of a coil of prefabricated collapsed conduit; and FIGURE 17 is a fragmentary perspective view showing a short length of expanded conduit that has been cut from the coil shown in FIGURE 16 and maintained in its expanded or open position by brace means.

Referring to FIGURE 1 of the drawings, two elongated strips of metal 20, 21 are continuously withdrawn from metal coils (not shown) and guided by a laterally spaced-apart series of guide rolls 40 that contact each of the side edges of each metal strip and align the strips in side-by-side, spaced-apart relationship. The metal strips are advanced through the forming rolls in this relationship. The guided metal strips are then passed to and through two juxtaposed, laterally spaced, parallel series of forming rolls indicated generally at 59. The forming rolls progressively bend the outer marginal edge portion of each of the metal strips 20, 21 first upwardly 90° and then downwardly 90° upon the side marginal edge portions of a strip of fabric. The forming rolls are driven by means of motor 127, belt 128 and pulley 129. An elongated strip of flexible fabric 22 is continuously fed from an overhead coil (not shown) and slid along a downwardly sloping chute 80 to a fabric guide 81 that is supported by laterally spaced apart upright members 82' (shown in FIGURE 1) and 82 (shown in FIGURE 4). A weight 84 that is secured to the chute 80 is placed upon the fabric 22 and serves, together with the friction of the fabric against the chute itself, to maintain the fabric in an unwrinkled or unfolded condition. The fabric 22 passes under idler roll 85 which presses the fabric 22 against the surface of the guide 81, thus preventing the fabric from wrinkling.

The advancing, spaced-apart metal strips 20 and 21, together with the superimposed fabric 22, are permanently secured together by the forming rolls. The resulting secured-together product is advanced beneath idler roll 170 which, in turn, actuates a counting device 171 that indicates the length of secured-together product that has been produced.

The secured-together product, as continuously produced, is then continuously advanced toward the coiling reel 90. As the product is advanced toward the coiling reel 90, the unsecured inner marginal edge portion of each of the metal strips 20, 21 is gradually unfolded from beneath the fabric 22 by being pivoted 90° along its bent edge to a position wherein the former inner free edge becomes the outermost edge of the substantially flat secured-together product. The secured-together product is also gradually turned over 360° as it is continuously advanced toward the coiling reel 90. The unfolded and inverted secured-together product is then coiled on the coiling reel 90. When the roll-forming machine is first started, the advancing product may be unfolded and inverted by hand and then secured to the coiling reel 90. The coiling reel 90 must be sufficiently far from the staking rolls to permit the unfolding and inverting of the product without bending or distorting the metal strips 20, 21. The coiling reel 90 constantly provides directional tension to the strips advancing toward it and properly and automatically controls the speed of each of the advancing metal strips.

The coiling reel 90 is driven by a motor 130. More specifically, the motor 130 drives reduction gear 131, belt 132, variable speed reducing device 133, belt 134, and pulley 135 that is positioned at the side of the reel 90.

Motors 127 and 130 are preferably supplied with electric current from a common circuit so that both may be actuated and stopped simultaneously with a common switch.

After the desired length of the secured-together product has been produced, the product is severed by cutting device or powered squaring shears 172 and either packaged as a coil or again fed through the roll-forming machine in order to secure a second strip of flexible fabric to the remaining free edge portion of each of the metal strips 20, 21.

As is evident from FIGURE 1, the guide rolls 40, the series of juxtaposed, laterally spaced, parallel series of forming rolls 59, counting device 171 and cutting device 172 are all mounted on the table 173.

With further reference to FIGURE 2, two laterally spaced parallel series of forming rolls are employed. The laterally spaced-apart forming rolls are mounted on common shafts. As can be seen from FIGURE 3, each of the series of forming rolls includes successive mating pairs of vertically aligned rolls. The guide rolls 40 and forming rolls and their action upon the metal strips are more clearly shown in FIGURES 4 and 6–12.

As pointed out above, the metal strips 20 and 21 are guided by metal guide rolls 40 in the manner shown in FIGURES 2 and 6, before they are fed into the roll-forming portion 59 of the machine. FIGURE 6 shows the guide rolls 40 comprising two pairs of laterally spaced-apart, peripherally grooved guide rolls that rotate in a horizontal plane. The rolls 41 and 43 correspond with rolls 47 and 45, respectively. The first pair of rolls 41 and 43 are rotatably mounted on table 173 by bolts 42 and 44, respectively, and guide the side marginal edges of the advancing metal strip 21. Similarly, the second pair of guide rolls 45 and 47 are rotatably mounted on the table 173 by means of bolts 46 and 48, respectively, and guide the marginal side edges of the advancing metal strip 20.

The guided metal strips 20, 21 are then passed in spaced-apart, parallel, side-by-side relationship through the series of forming rolls in the manner indicated in FIGURES 7–12. More specifically, a series of upper, spaced-apart, forming rolls and lower, spaced-apart, mating, forming rolls progressively bend an outer marginal edge portion of each of the metal strips 20 and 21 upwardly and then downwardly upon the side marginal edge portions of the strip of flexible fabric 22 that is placed upon and advanced with the metal strips 20, 21.

FIGURES 7–9 show the first three sets of forming rolls comprising upper rolls 60–60', 62–62' and 64–64' and lower forming rolls 61–61', 63–63' and 65–65', respectively.

Immediately after the roll-forming step shown in FIGURE 9, but before the roll-forming step shown in FIGURE 10, the elongated fabric 22 is continuously placed in an unwrinkled condition upon the spaced-apart, parallel metal strips 20, 21. As shown in FIGURES 2, 3 and 4, the fabric guide 81 extends from above the forming rolls to a position between the series of forming rolls shown in FIGURES 9 and 10. The fabric slides over the convex surfaces of the guide 81 and is thereby introduced into the nip between the upper forming rolls 66–66' and lower forming rolls 67–67'.

The fabric guide 81 terminates in a presser tongue 83 that is positioned between the laterally spaced forming rolls and extends beyond the upper forming rolls 66–66'. The tongue 83 serves to hold the fabric in place and additionally functions together with the curvature of the fabric guide 81 to properly position the fabric 22 in an unwrinkled condition upon the advancing metal strips 20, 21.

The fabric guide 81 is curved, both along its length and along its width. The curvature of the fabric guide 81 serves to prevent the wrinkling of the fabric 22. Additionally, the fabric 22 is preferably provided with a sewn beaded edge portion at each of its longitudinal edges. The beaded edge portions of the fabric 22 do not stretch as readily as does the remainder of the fabric 22. The fact that the fabric guide 81 is curved along its width, as shown in FIGURE 2, prevents the fabric 22 from being displaced to either side of the fabric guide 81. Preferably, the fabric guide 81 is tapered along its entire length from an enlarged entrance end to an exit end of the same width as the space between the upstanding edge portions of the metal strips 20, 21 so as to compensate for variations in the width of the fabric 22.

The metal strips 20, 21 together with the superimposed fabric 22, are then engaged by upper forming rolls 66–66′ and mating lower forming rolls 67–67′ in the manner shown in FIGURE 10. FIGURE 10 shows that upper forming rolls 66–66′ have a circumferential bead 66A–66″, respectively. The metal beads 66A and 66″ serve to engage the fabric 22 and maintain the proper positioning of the fabric 22. The metal beads are more effective when the fabric 22 is provided with a beaded edge portion, since in that event, it is more difficult for the side edges of the fabric 22 to ride out of their proper position.

As shown in FIGURE 11, the upper forming rolls 68–68′ and mating lower forming rolls 69–69′ function to engage the outer marginal edge portions of the metal strips 20, 21 and progressively fold these outer edge portions toward the side edge portions of the fabric 22.

The product emerging from the forming rolls shown in FIGURE 11 is advanced to the upper staking or crimping rolls 72–72′ and complementing lower rolls 73–73′. These forming rolls progressively bend the outer marginal edge portions of the metal strips 21, 20 into firm engagement upon the side edge portions of the fabric 22. It is not necessary to positively drive these rolls; instead, the crimping rolls are rotated by passage of the product therebetween.

The secured-together, metal-fabric-metal product is continuously advanced from the roll-forming station illustrated in FIGURE 12 toward the coiling reel 90 that is aligned with the forming rolls. However, before the secured-together product is actually coiled on the coiling reel 90, it is unfolded into a substantially flat position and turned over, in the desired order, in the manner described above. The secured-together, substantially flat product is then continuously coiled while tension is applied to the advancing product by the coiling reel 90.

The secured-together product is then continuously passed through the machine a second time with the metal strips in spaced-apart, parallel relationship and is subjected to the same forming rolls shown in FIGURES 7–12; a second strip of flexible fabric 23 is continuously placed upon the first strip of fabric 22 and the metal strips 20, 21 in the manner described above with respect to the fabric 22; and the free, outermost edge portions of the metal strips 20, 21 are progressively secured to the side edges of the second fabric 23. The resulting secured-together, collapsed conduit is continuously coiled on the coiling reel 90 while the coiling reel constantly applies directional tension to the advancing strips.

In the second pass through the machine, the secured-together product formed during the first pass is continuously withdrawn from its coil (not shown) with the unfolded metal-fabric-metal in the same substantially flat, unfolded and inverted position in which it was coiled. Thus, since the secured-together product was advanced to the top of the coiling reel 90 and the reel was rotated in a clockwise manner, as shown in FIGURE 1, the product must be withdrawn from a coil that rotates clockwise. It should be noted, however, that the secured-together product need not be inverted, as described above, if it is coiled in a clockwise maner and then uncoiled from a coil that is rotated counterclockwise.

The withdrawn secured-together product is then guided by a laterally spaced-apart series of guide rolls 50 that contact each of the side edges of each metal strip 20, 21 and align the strips, with the fabric 22 secured therebetween, in side-by-side, spaced-apart, substantially parallel relationship. The guide rolls 50 replace guide rolls 40 during the second pass. Rolls 50 are positioned where the guide rolls 40 are shown in FIGURES 1 and 2 and may be removably positioned in the table 173 after bolts 42, 44, 46 and 48 of guide rolls 40 are removed.

FIGURE 13 shows the guide rolls 50 comprising two pairs of laterally spaced-apart peripherally grooved guide rolls that rotate in a horizontal plane. The rolls 51 and 53 correspond with rolls 57 and 55, respectively. The first pair of rolls 51 and 53 are rotatably mounted on table 173 by bolts 52 and 54, respectively, and guide the side marginal edges of the advancing metal strip 20. Similarly, the second pair of guide rolls 55 and 57 are rotatably mounted on table 173 by bolts 56 and 58, respectively, and guide the marginal side edges of the advancing metal strip 21.

The guided, secured-together, unfolded product is then passed, with the metal strips 20, 21 in spaced-apart, parallel, side-by-side relationship, through the same series of forming rolls shown in FIGURES 7–12, and the outermost edge portion of the metal strips 20, 21 are subjected to the same progressive bending action.

FIGURE 14 is similar to FIGURE 7 and shows the first roll-forming step of the second pass.

FIGURE 15 is similar to FIGURE 12 and shows the staking or crimping rolls progressively bending the outermost edge portions of the metal strips 20, 21 securely upon the side marginal edges of the second strip of fabric 23 to form a collapsed, substantially flat, secured-together, prefabricated conduit.

The secured-together collapsed conduit is then continuously advanced onto the coiling reel 90 to form a coil containing a plurality of laps of collapsed conduit. The coiling reel 90 constantly applies directional tension to the substantially flat, collapsed conduit. After the desired length of prefabricated collapsed conduit has been produced and coiled on the coiling reel 90, the product is severed by cutting device 172, removed from or with the coiling reel, and packaged as a coil 25. FIGURE 16 illustrates the construction of a coil 25 of the prefabricated collapsed conduit after it has been removed from the coiling reel 90.

A desired length of the collapsed conduit may be removd from the coil 25 and expanded and maintained in that position to provide a four-sided expanded or open conduit 30 having a pair of opposed metal sides 20, 21 and opposed fabric sides 22, 23 the width of each of which is at least equal to the combined width of metal sides 20, 21, a feature important to assure proper coiling. FIGURE 17 is a fragmentary perspective view showing a short length of expanded conduit 30 that has been cut from the coil 25 and maintained in its open position by means of braces 31. The braces 31 maintain the fabric in an extended position.

Each brace 31 comprises a substantially U-shaped channel 32 having U-shaped clips 33 and 34 positioned at its ends in clamping engagement with the metal strips 21 and 20, respectively. Each of the clips 33 and 34 have a hold for receiving metal screws 35 that more securely affix the brace 31 to the metal strips 20, 21.

The forming rolls 60–60′ to 68–68′ and 61–61′ to 69–69′ are driven by motor 127, belt 128, and pulley 129 which is mounted upon shaft 101. As shown in FIGURE 2, the shaft 101 extends through plate 150 that is mounted on table 173. Plate 150 additionally carries shafts 102, 103 and 104 shown in FIGURE 2. Further, shafts 101', 102', 103' and 104' are carried on plate 150 immediately below shafts 101, 102, 103 and 104, respectively (see FIGURE 5). Shafts 101, 101', 102, 102', 103, 103', 104 and 104' carry power transmitting gears 105, 105', 106, 106', 107, 107', 108 and 108', respectively.

As can be seen from FIGURES 2 and 5, rotation of pulley 128 causes rotation of gear 105, which directly drives gears 124 and 125 which power forming rolls 66–66' and 68–68'. Gear 124 additionally rotates gear 106 which in turn causes rotation of gears 123, 107, 122, 108 and 121, thus powering forming rolls 64–64', 62–62' and 60–60'. Gear 125 meshes with gear 125' to power forming rolls 69–69'. Gear 125' in turn causes rotation of gears 105', 124', 106', 123', 107', 122', 108' and 121', thus powering forming rolls 67–67', 65–65', 63–63' and 61–61'.

The foregoing detailed description has been given for clearness of understanding only, and no unnecessary limitations should be understood therefrom, as modifications will be obvious to those skilled in the art.

I claim:

1. A length of substantially flat, collapsed, flexible, coilable conduit comprising:
   a pair of elongated, coilable metal sides;
   a pair of opposed, elongated, flexible, coilable fabric sides;
   and means, along a longitudinal edge portion of each side, marginally connecting each side in a pair of sides to the other pair of sides;
   the width of at least one fabric side being at least equal to the combined widths of the two metal sides.

2. A length of collapsed conduit as recited in claim 1 wherein each fabric side has a width at least equal to the combined widths of the two metal sides.

3. A length of collapsed conduit as recited in claim 2 wherein each fabric side has a width greater than the combined widths of the two metal sides.

4. A coil containing a plurality of laps of a substantially flat, collapsed, flexible conduit compriisng:
   a pair of elongated, coilable metal sides;
   a pair of opposed, elongated, flexible, coilable fabric sides;
   and means, along a longitudinal edge portion of each side, marginally connecting each side in a pair of sides to the other pair of sides;
   the width of at least one fabric side being at least equal to the combined widths of the two metal sides;
   said opposed metal sides being disposed in side-by-side, non-overlapping relationship in said coil.

5. A length of expanded, collapsible, coilable conduit comprising:
   a pair of opposed, elongated, coilable metal sides;
   a pair of opposed, elongated, flexible, coilable fabric sides;
   means, along a longitudinal edge portion of each side, marginally connecting each side in an opposed pair of sides to the other pair of opposed sides;
   the width of at least one fabric side being at least equal to the combined widths of the two metal sides;
   and brace means, extending between said metal sides, for maintaining said conduit in an expanded condition and for supporting said flexible fabric sides.

References Cited by the Examiner

UNITED STATES PATENTS

| 686,817 | 11/01 | MacPhail | 138—163 |
| 906,106 | 12/08 | Christoph | 138—163 |
| 1,573,721 | 2/26 | Loeffler | 150—49 XR |
| 2,066,304 | 12/36 | Smith | 29—509 |
| 2,214,426 | 9/40 | Meacham. | |
| 2,264,897 | 12/41 | Becker et al. | 29—509 |
| 2,814,529 | 11/57 | Arnt | 138—178 XR |
| 2,825,384 | 3/58 | Goldsmith | 137—178 XR |
| 2,974,342 | 3/61 | Fell | 138—128 XR |
| 3,085,596 | 4/63 | Rejeski | 138—135 XR |

LEWIS J. LENNY, *Primary Examiner.*

EDWARD V. BENHAM, *Examiner.*